US008172265B2

(12) United States Patent
James et al.

(10) Patent No.: US 8,172,265 B2
(45) Date of Patent: *May 8, 2012

(54) VEHICLE FOR DEPLOYING A MOBILE SURVEILLANCE MODULE

(75) Inventors: Tom R. James, Dallas, TX (US); John R. Spence, Dallas, TX (US)

(73) Assignee: TerraHawk, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/782,734

(22) Filed: May 19, 2010

(65) Prior Publication Data

US 2011/0101719 A1    May 5, 2011

Related U.S. Application Data

(63) Continuation of application No. 12/613,183, filed on Nov. 5, 2009, now Pat. No. 7,726,690.

(51) Int. Cl.
*G01C 5/00* (2006.01)

(52) U.S. Cl. .................. 280/764.1; 296/26.06; 182/69.5

(58) Field of Classification Search .................. 280/6 R, 280/6 H, 6.1, 764.1; 352/132; 354/81; 358/108; 52/115, 116, 118; 212/189; 296/39.3, 24.1, 296/35.1; 414/495; 62/440
See application file for complete search history.

(56) References Cited

U.S. PATENT DOCUMENTS

| 2,787,343 | A |   | 4/1957  | Mitchell        |         |
|-----------|---|---|---------|-----------------|---------|
| 2,797,833 | A |   | 7/1957  | Cash            |         |
| 2,935,218 | A |   | 5/1960  | Fritz           |         |
| 2,959,244 | A |   | 11/1960 | Fedde           |         |
| 3,126,112 | A |   | 3/1964  | Shaw et al.     |         |
| 3,608,954 | A |   | 9/1971  | Lynd            |         |
| 3,664,459 | A |   | 5/1972  | Stephens et al. |         |
| 3,666,046 | A |   | 5/1972  | Meineck, Jr.    |         |
| 4,084,830 | A |   | 4/1978  | Daniel, Jr. et al. |      |
| 4,092,011 | A |   | 5/1978  | Luebke          |         |
| 4,320,949 | A |   | 3/1982  | Pagano          |         |
| 4,593,474 | A | * | 6/1986  | Mayhew          | 33/264  |
| 4,741,413 | A |   | 5/1988  | Kishi           |         |
| 4,815,757 | A |   | 3/1989  | Hamilton        |         |
| 4,913,458 | A | * | 4/1990  | Hamilton        | 280/6.153 |

(Continued)

FOREIGN PATENT DOCUMENTS

CH          660 339 A5        3/1983

(Continued)

OTHER PUBLICATIONS

Li Donghu, "An Anti-riot Cash Transit Vehicle,"Publication No. CN 1370698A, Application No. 01106194.4, 6 pages, Feb. 26, 2001.

(Continued)

*Primary Examiner* — Tony H. Winner
*Assistant Examiner* — Jacob Knutson
(74) *Attorney, Agent, or Firm* — Baker Botts L.L.P.

(57) ABSTRACT

A surveillance module may be deployed from a vehicle. The vehicle to deploy the surveillance module includes a first portion configured to accommodate a user to operate the vehicle. A second portion includes a module configured to accommodate the user and comprising a roof and an entrance accessible through an interior of the vehicle from the first portion. The second portion also includes a lifting mechanism coupled to the module and operable to move the module vertically from a retracted position to an extended position. A third portion defines an opening to accommodate the module, wherein the roof of the module couples to a periphery of the opening in the retracted position.

20 Claims, 8 Drawing Sheets

U.S. PATENT DOCUMENTS

| | | | |
|---|---|---|---|
| 4,981,319 A * | 1/1991 | Gerzeny et al. | 296/26.07 |
| 5,078,441 A * | 1/1992 | Borskey | 296/26.07 |
| 5,139,110 A | 8/1992 | Kishi | |
| 5,280,985 A | 1/1994 | Morris | |
| 5,297,653 A | 3/1994 | Wurtz et al. | |
| 6,050,573 A | 4/2000 | Kunz | |
| 6,384,741 B1 | 5/2002 | O'Leary | |
| 6,405,997 B1 | 6/2002 | Granata | |
| 6,439,635 B1 | 8/2002 | Hardy et al. | |
| 6,447,044 B1 | 9/2002 | Buker et al. | |
| 6,460,653 B1 | 10/2002 | Hardy et al. | |
| 6,565,143 B2 * | 5/2003 | Okamoto | 296/165 |
| 6,594,565 B1 | 7/2003 | Schafer et al. | |
| 6,744,372 B1 | 6/2004 | Shaw et al. | |
| 6,948,722 B2 | 9/2005 | Sproatt et al. | |
| 7,186,205 B2 | 3/2007 | Lahr et al. | |
| 7,193,381 B2 | 3/2007 | Ford et al. | |
| 7,523,587 B2 | 4/2009 | Baird | |
| 7,555,369 B2 | 6/2009 | Pillar et al. | |
| 7,628,551 B2 | 12/2009 | Leyden et al. | |
| 2002/0027042 A1 | 3/2002 | Beji | |
| 2002/0125736 A1 | 9/2002 | Messano | |
| 2002/0134620 A1 | 9/2002 | Meyer | |
| 2003/0000769 A1 | 1/2003 | Pyle | |
| 2005/0274573 A1 | 12/2005 | Smith | |
| 2008/0012941 A1 | 1/2008 | Brown | |
| 2009/0086043 A1 | 4/2009 | Scheucher | |
| 2009/0091096 A1 | 4/2009 | Samaniego | |
| 2009/0205880 A1 | 8/2009 | Hammonds | |
| 2009/0230709 A1 | 9/2009 | Beauchamp | |

FOREIGN PATENT DOCUMENTS

| | | |
|---|---|---|
| DE | 33 17 003 A1 | 11/1984 |
| DE | 39 42 754 A1 | 4/1991 |
| EP | 0 949 190 A2 | 10/1999 |
| EP | 1 607 366 A1 | 12/2005 |
| FR | 2 903 974 A1 | 1/2008 |

OTHER PUBLICATIONS

PCT, Notification of Transmittal of the International Search Report and the Written Opinion of the International Searching Authority, or the Declaration, International Application No. PCT/US2010/055208, 12 pages, mailed Feb. 17, 2011.

* cited by examiner

VEHICLE FOR DEPLOYING A MOBILE SURVEILLANCE MODULE

RELATED APPLICATIONS

This application is a continuation of U.S. application Ser. No. 12/613,183, filed Nov. 5, 2009 entitled "Vehicle for Deploying a Mobile Surveillance Module."

TECHNICAL FIELD OF THE INVENTION

This invention relates generally to surveillance operations and more specifically, to a vehicle for deploying a mobile surveillance module.

BACKGROUND

Surveillance units are helpful for security operations to allow personnel to view surrounding areas. The deployment and relocation sequences of surveillance units are slow and cumbersome, which compromises the safety of the personnel manning the units. Additionally, the slow deployment and relocation sequences may inhibit the personnel's ability to perform certain tasks.

SUMMARY OF THE DISCLOSURE

In accordance with the present invention, disadvantages and problems associated with the deployment of a mobile surveillance module may be reduced or eliminated.

According to one embodiment of the present invention, a vehicle for deploying a surveillance module includes a first portion configured to accommodate a user to operate the vehicle. A second portion includes a module configured to accommodate the user and comprising a roof and an entrance accessible through an interior of the vehicle from the first portion. The second portion also includes a lifting mechanism coupled to the module and operable to move the module vertically from a retracted position to an extended position. A third portion defines an opening to accommodate the module, wherein the roof of the module couples to a periphery of the opening in the retracted position.

According to another embodiment of the present invention, a vehicle for deploying a surveillance module includes a module configured to accommodate a user and comprising a module roof and an entrance accessible through an interior of the vehicle from a seat for the user to operate the vehicle. A lifting mechanism couples to the module and is operable to move the module vertically from a retracted position to an extended position through an opening in a top of the vehicle. The module roof couples to the top of the vehicle in the retracted position. A plurality of jacks are operable to extend from the vehicle to a surface to stabilize the vehicle prior to moving the module vertically from the retracted position, and a hydraulic unit couples to the lifting mechanism and the jacks and is operable to distribute hydraulic fluid to the lifting mechanism and the jacks.

Certain embodiments of the invention may provide one or more technical advantages. A technical advantage of one embodiment is improving the safety of a user manning a surveillance module. According to an embodiment of the present invention, the user may enter the surveillance module without leaving the vehicle, which prevents exposure to the outside elements or other potential hazards while moving into position to survey an area. Another technical advantage of an embodiment is providing a mobile module that a user can position in any suitable location. Improving the mobility of the surveillance module decreases costs associated with surveillance activities because modules can be moved between locations. Another technical advantage of an embodiment is decreasing the amount of time it takes for a user to begin surveillance activities. A user may quickly deploy the surveillance module. Yet another technical advantage of an embodiment is the increased elevation of the module, which enhances a user's field of view. Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5B, like numerals being used for like and corresponding parts of the various drawings.

Figure 1:
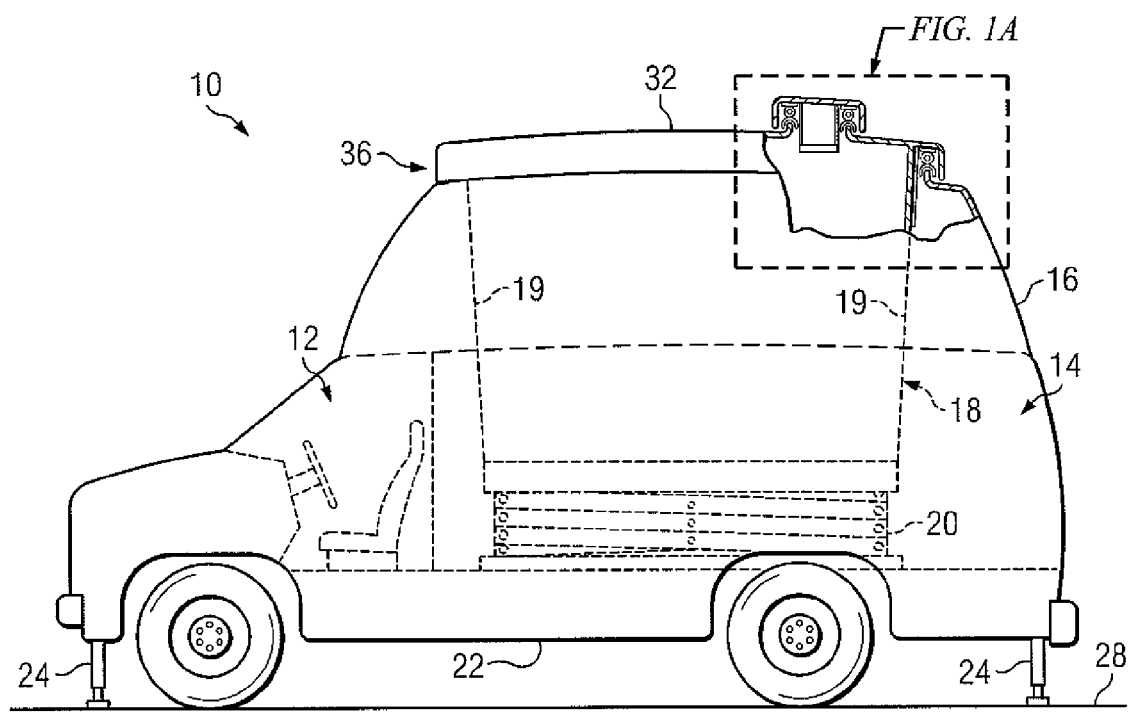
FIG. 1 illustrates an embodiment of a vehicle that facilitates the deployment of a mobile surveillance module.

FIG. 1 illustrates an embodiment of a vehicle 10 that facilitates the deployment of a mobile surveillance module 18. Vehicle 10 includes a first portion 12, a second portion 14, a third portion 16, a module 18, a lifting mechanism 20, and jacks 24. Vehicle 10 equipped with module 18 enhances a user's ability to survey an area.

Vehicle 10 represents any suitable transportation apparatus that houses module 18. In the illustrated embodiment, vehicle 10 is a van. In other embodiments, vehicle 10 may be a recreational vehicle, a tank, a sports utility vehicle, a bus, a pick-up cab chassis with an added box, a cutaway vehicle with a walk-in step or a multi-step body, a bobtail truck, a box van, a hybrid van, any tactical coach, any tactical command post, a delivery van, any wheeled vehicle, any tracked vehicle, or any other transportation apparatus that is capable of accommodating module 18. A user may use vehicle 10 for surveillance, security, military, law enforcement, and/or traffic control applications.

Vehicle 10 includes any suitable component that allows a user to operate vehicle 10. For example, in the illustrated embodiment, vehicle 10 includes four tires that allow a user to drive vehicle 10 on a surface 28. Vehicle 10 may also include four-wheel drive to improve the drivability of vehicle 10 in different weather conditions or on different surfaces. In the illustrated embodiment, vehicle 10 includes a first portion 12, a second portion 14, a third portion 16, and a base 22 that include components to facilitate the operation of vehicle 10 and module 18. The components in first portion 12, second portion 14, and third portion 16 are only illustrative and each of first portion 12, second portion 14, and third portion 15 may include one or more components that are distributed or consolidated within one or more of the portions. First portion 12, second portion 14, and third portion 16 represent different areas of vehicle 10 and may be combined as a single unit.

First portion 12 includes components that allow a user to operate vehicle 10. For example, first portion 12 includes a steering wheel, seats for a driver and a passenger, an interface to control module 18, an engine, a transmission, a front suspension, shock absorbers, an emergency parking brake, other internal automotive components, steps for a user to enter module 18, and any other component that allows a user to operate vehicle 10. First portion 12 may also include components to enhance a user's experience while in vehicle 10, such as a radio, air conditioning, a heater, power windows, and/or power door locks.

Second portion 14 also includes components to facilitate the operation of vehicle 10. For example, second portion 14 includes a rear suspension, shock absorbers, module 18, and a lifting mechanism 20. Second portion 14 also includes control components, such as a processor, a hydraulic unit, a memory, sensors, and actuators as described below in FIG. 3. In an embodiment, the rear suspension accommodates the increased load capacity presented by module 18 and lifting mechanism 20.

Third portion 16 represents an extension of vehicle 10 that accommodates module 18. Third portion 16 may include a fabricated bonnet made of any suitable material, such as fiberglass, aluminum, or reinforced plastic. In an embodiment, vehicle 10 may be retrofitted to include third portion 16. In another embodiment, vehicle 10 includes third portion 16, and appears as a single element from the exterior before module 18 extends. When module 18 is retracted, it is not detectable from outside vehicle 10. In the illustrated embodiment, third portion 16 has an opening 36 that module 18 and lifting mechanism 20 extend through during deployment.

Figure 2:
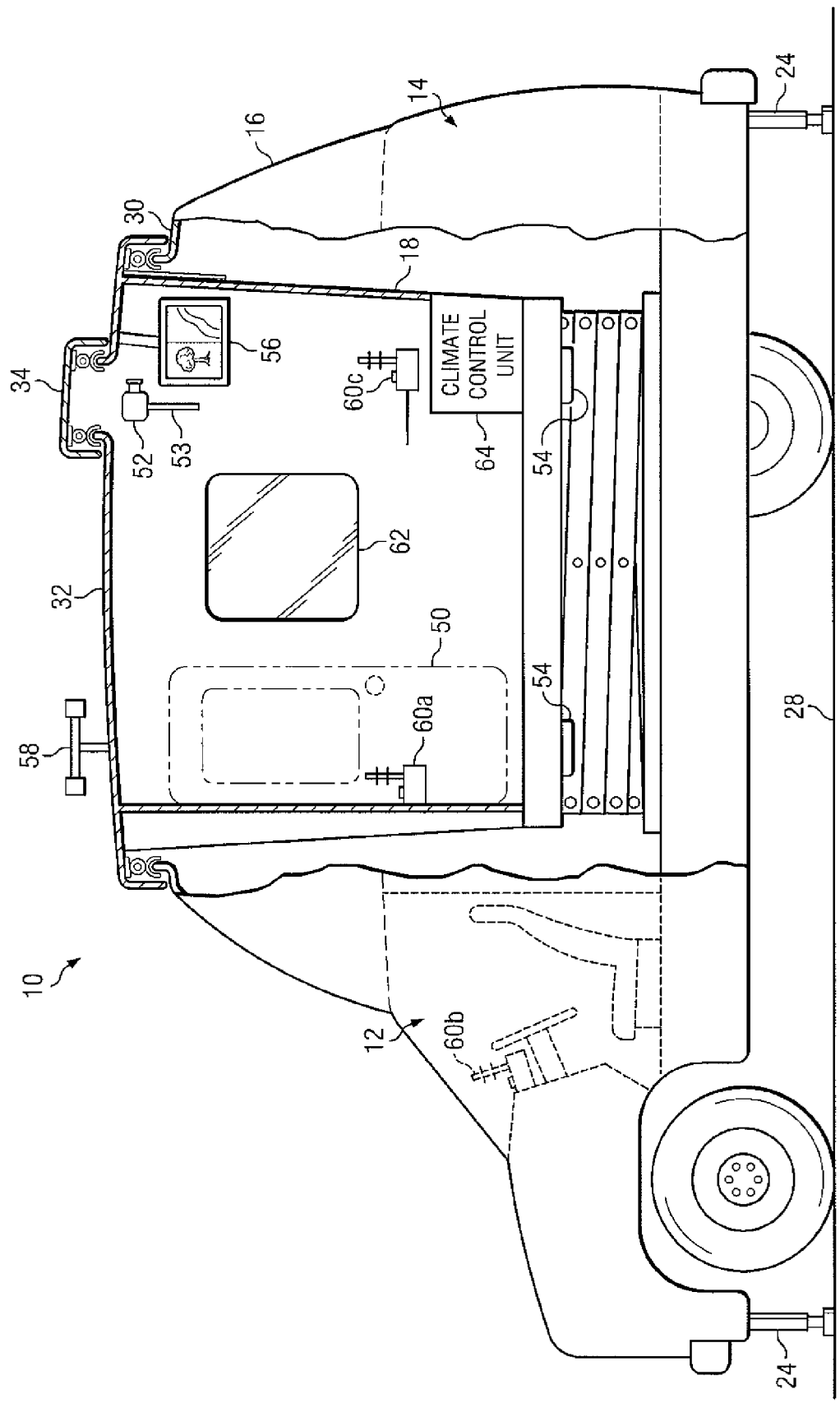
FIG. 2 illustrates the module in more detail.

Module 18 represents an enclosed, self-contained capsule within vehicle 10 that a user may enter from first portion 12 and occupy to survey a surrounding area when module 18 deploys. Module 18 may be a fiberglass capsule, an aluminum capsule, a steel capsule, or a reinforced plastic capsule. Module 18 may accommodate any number of users up to a maximum weight capacity. In an embodiment, a driver of vehicle 10 moves into module 18 and occupies module 18. In the illustrated embodiment, the walls 19 of module 18 taper from top to bottom to maximize the interior space. Tapered walls 19 also improve the movement of module 18 during deployment and retraction. More specifically, tapered walls 19 serve to self-center and align module 18 with the installation of replaceable rub pads 41 on each side of module 18. Pads 41 guide module 18 into opening 36 to provide a sealed area. Tapered walls 19 also secure module 18 in a stowed position while vehicle 10 is in motion. A user may customize module 18 to meet specific requirements. In one embodiment, module 18 includes an anti-shear bracket and lock to prevent movement of module 18 while vehicle 10 is moving. FIG. 2 describes a particular embodiment of module 18 and the components within module 18 in greater detail.

Lifting mechanism 20 represents any suitable mechanism to extend and retract module 18. For example, lifting mechanism 20 may be an articulating boom, a telescopic cylinder, or a scissor lift. In a particular embodiment, lifting mechanism 20 is a hydraulic scissor lift. In a particular embodiment, lifting mechanism 20 has scissor arms that are 3"×5" hollow, rectangular steel sections that include: steel pivot pins having zinc electroplating to prevent corrosion and self-lubricating pivot bearings that do not require external lubrication or maintenance. Lifting mechanism 20 also may include sensors to ensure the unit is level before extending. In a particular embodiment, lifting mechanism 20 levels to at least two degrees from side-to-side and to at least two degrees from front-to-back. Lifting mechanism 20 extends vertically to any suitable height. In an embodiment, lifting mechanism 20 extends nineteen-feet above base 22 of vehicle 10. In the illustrated embodiment, lifting mechanism 20 has a rated net load of 1,350 pounds and a gross certified lift capacity of 2,000 pounds. Lifting mechanism 20 mounts to vehicle 10 using any rigid, structural mount, such as a stack-to-chassis mount or a designed steel slide mount. Lifting mechanism 20 may attach to the frame of vehicle 10 with bolts and may attach to the bottom of module 18 using the mount. The mount provides the necessary support for lifting mechanism 18 without putting additional stresses into the chassis frame. In fact, the mount increases the strength of the chassis frame. The mount also aligns lifting mechanism 20 and prevents movement of lifting mechanism 20 while in the retracted position and while vehicle 10 is moving. In another embodiment, lifting mechanism 20 also includes an anti-shear bracket and lock to prevent movement of lifting mechanism 20 while in the compressed position and while vehicle 10 is moving.

Base 22 represents the bottom of vehicle 10 and has a first side and a second side. The first side is inside the vehicle and the second side is outside the vehicle. Base 22 may include the undercarriage, a frame, or other structural component of vehicle 10. In the illustrated embodiment, lifting mechanism 18 attaches to the first side of base 22 and jacks 24 mount to the second side of base 22 and extend from the second side.

Vehicle 10 may include any suitable number of jacks to adequately stabilize vehicle 10. For example, vehicle 10 includes two jacks 24 that mount between the front and rear tires of vehicle 10. As another example, vehicle 10 includes three jacks 24. One jack 24 mounts between the front tires and the other two jacks 24 mount near the rear tires in second portion 14. In the illustrated embodiment, vehicle 10 includes four jacks 24. Two jacks 24 are located in first portion 12 and two jacks 24 are located in second portion 14. In an embodiment, each jack 24 is located near a tire. This provides additional support for the vehicle when module 18 deploys. In a particular embodiment, jacks 24 in first portion 12 are in front of the tires and jacks 24 in second portion 14 are behind the tires. Increasing the distance between jacks 24 improves the stability of vehicle 10, and the location of jacks 24 provides for an isometric advantage for vehicle 10. Jacks 24 may also mount behind the front and rear bumpers and the side portions of vehicle 10. This allows for the concealment of jacks 24 while in the retracted position and protects jacks 24 from external conditions.

Jacks 24 mount to a frame positioned on the second side of base 22 and extend from base 22 to stabilize vehicle 10 on surface 28. Jacks 24 may be mechanical jacks, hydraulic jacks, strand jacks, spring-loaded jacks, electro-mechanical linear jacks, or any other devices operable to lift a heavy load. Jacks 24 are capable of handling any amount of force. For example, each jack 24 generates 7,850 pounds of force. Each jack 24 includes a pad that contacts surface 28 to distribute the weight of vehicle 10 over an area. In a particular embodiment, jacks 24 are part of a electro-hydraulic stabilization system. Jacks 24 may be metal or steel and integrate within vehicle 10 by mounting to the second side of base 22. The actuation of jacks 24 is described in greater detail with respect to FIG. 3.

In an embodiment, jacks 24 operate in multiple modes. In a first mode, jacks 24 extend from base 22 to contact surface 28. In a second mode, jacks 24 adjust cooperatively to level vehicle 10. Jacks 24 may adjust according to signals from a pressure sensing transducer, a proximity switch, or a floating jack with a proximity switch. In this mode, jacks 24 have a maximum adjustment capability, or stroke, and may not level vehicle 10 within safe tolerances depending on the condition and variances in surface 28. In association with the stabilization system, jacks 24 level vehicle 10 to within 5" from front-to-back and to within 2.5" from side-to-side. If jacks 24 cannot adjust to level vehicle 10, a user may move vehicle 10 to a new position. In a third mode, jacks 24 remain fixed. While the stabilization system may continue to sense whether vehicle 10 is level in this mode, jacks 24 may not adjust their position without user intervention or further action from the stabilization system.

Vehicle 10 may operate on any suitable surface, such as sand, dirt, pavement, concrete, and/or grass. Surface 28 may be soft, hard, angled, wet, or dry. Jacks 24 may adapt to a variety of conditions and variances of surface 28. For example, jack 24 senses that surface 28 is soft and stabilizes after adjusting and sensing surface 28. As another example, one jack 24 may sense a soft surface 28 while another jack 24 senses a hard surface 28. Each jack 24 adjusts according to different surfaces 28. As yet another example, jack 24 senses an uneven, soft, and unpredictable surface 28. If jacks 24 cannot level vehicle 10 on surface 28, module 18 may not extend. As another example, surface 28 is solid, but there is a height difference between jacks 24 as jacks 24 contact surface 28. If the height difference is too great to overcome the given maximum stroke of jacks 24, module 18 may not extend.

Figure 1A:
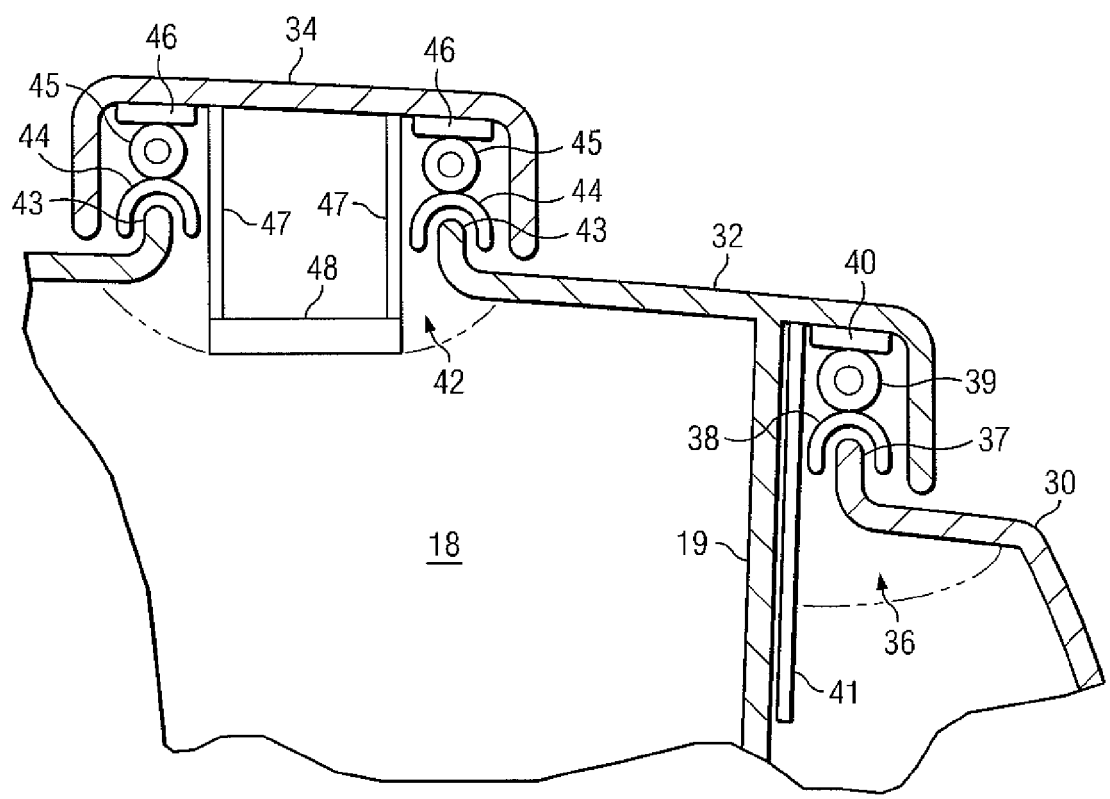
FIG. 1A illustrates a detailed perspective of the uppermost portions of the vehicle and the module.

FIG. 1A illustrates a detailed perspective of the uppermost portions of vehicle 10 and module 18. Top 30 represents the uppermost part of third portion 16. Top 30 may be any material that withstands external elements and conditions. For example, top 30 is aluminum, reinforced plastic, metal, steel, or fiberglass. Top 30 protects the components within second portion 14 and third portion 16 from external conditions. Roof 32 couples to top 30 of third portion 16 when module 18 is in the retracted position. In the illustrated embodiment, top 30 defines an opening 36 to accommodate module 18. A rim 37 around opening 36 couples to the interior components of roof 32 to create a tight, waterproof seal.

Roof 32 of module 18 may be formed of aluminum, reinforced plastic, metal, steel, or fiberglass and protects a user within module 18 from external conditions. In the illustrated embodiment, the interior components of roof 32 include a lip 38, a first weather strip 39, and a second weather strip 40. Rim 37 of top 30 couples to lip 38 of roof 32 to create the seal. Any suitable pliable material may be used to ensure a tight seal between top 30 and roof 32. For example, weather strip 39 may include a rubber seal or extrusion, such as Trim-Lok™, and weather strip 40 may include a foam weather strip. Rub pad 41 also couples to roof 32 and is positioned on each side of module 18. Rub pad 41 guides module 18 into opening 36 and serves to self-center and align module 18 within opening 36. Roof 32 also couples to cover 34. In the illustrated embodiment, roof 32 has an opening 42 to accommodate a camera. A rim 43 around opening 42 couples to the interior components of cover 34 to create a tight, waterproof seal.

Cover 34 may be formed of aluminum, reinforced plastic, metal, steel, or fiberglass and covers a camera that extends from opening 42. Cover 34 also extends when the camera raises. In the illustrated embodiment, the interior components of cover 34 include a lip 44, a first weather strip 45, and a second weather strip 46. Rim 43 of roof 32 couples to lip 44 of cover 34 to create the seal. Any suitable pliable material may be used to ensure a tight seal between roof 32 and cover 34. For example, weather strip 45 may include a trim lock weather strip, and weather strip 46 may include a foam weather strip. Rub pads 47 also couple to cover 34 and are positioned on each side of cover 34. Rub pads 47 couple to platform 48, which may hold the camera. Rub pads 47 guide platform 48 into opening 42 and serves to self-center and align platform 48 within opening 42.

In operation, a user positions vehicle 10 in a location to deploy module 18. After placing vehicle 10 in park, the user enters module 18 from first portion 12 without exiting vehicle 10. Since the user can access module 18 directly from the driver's seat of vehicle 10 without opening any external doors or windows, this improves safety and convenience during surveillance operations. This is a significant improvement over prior systems that required a user to exit a vehicle to enter and operate a surveillance module.

The deployment sequence begins when a user pushes a button or when vehicle 10 remains in park for a predetermined period of time. At the initiation of the deployment sequence, vehicle 10 checks safety conditions. Safety conditions may include any suitable condition, such as vehicle 10 being in park, vehicle 10 being stationary for a predetermined period of time, the ignition of vehicle 10 being off, the emergency parking brake being engaged, an entrance to module 18 being closed and/or a user being in module 18. Upon a complete check and confirmation of the initial safety conditions, jacks 24 operate in a first mode and extend from base 22. Jacks 24 sense the condition of surface 28 and, in a second mode, adjust their positioning to level vehicle 10 responsive to the condition of surface 28. Upon determining that vehicle 10 is level, jacks 24 enter the third mode and remain fixed.

Upon reconfirming the initial safety conditions, additional safety conditions may be confirmed before module 18 extends, such as confirming that vehicle 10 is level, confirming that jacks 24 are extended and stable, and/or confirming that an obstruction is not above vehicle 10 before module 18 extends. Lifting mechanism 20 then actuates and begins extending upon the safety conditions being met. As lifting mechanism 20 extends, roof 32 of module 18 decouples from rim 37 of top 30, and module 18 moves from a retracted position out of third portion 16. Lifting mechanism 20 continues to extend until module 18 is completely outside of vehicle 10. In an embodiment, module 18 completely raises in less than thirty seconds to an extended position, and a user inside module 18 may have an observation height of over twenty-five feet from surface 28.

Upon the completion of the surveillance activities, the user initiates a retraction sequence to compress lifting mechanism 20 and lower module 18 from the extended position into third portion 16. Once lifting mechanism 20 completely retracts and module 18 is in the retracted position inside third portion 16, jacks 24 retract into base 22 by user initiation. When jacks 24 have retracted into base 22, a user reenters first portion 12 from module 18 and moves vehicle 10 to a new location. Before the user moves vehicle 10, another set of safety conditions may be confirmed, such as determining whether jacks 24 have retracted into vehicle 10 and/or determining that camera 52 has retracted into module 18.

Modifications, additions, or omissions may be made to vehicle 10 without departing from the scope of the invention. For example, vehicle 10 may not include jacks 24, but may include other devices to ensure vehicle 10 is stable and in a safe level range to operate. Vehicle 10 may include a torsion bar, an anti-sway device, or other suitable mechanical device to lock out the suspension system of vehicle 10. In an embodiment, the torsion bar mounts to the frame of vehicle 10 to stabilize vehicle 10. Module 18 may extend once vehicle 10 is stable and positioned in a safe level range. As another example, once vehicle 10 stabilizes and levels within a safe range, module 18 may extend without locking the suspension system of vehicle 10 because lifting mechanism 20 is within the wheel footprint of vehicle 10. As yet another example, module 18 may extend from vehicle 10 once vehicle 10 is stable, but without leveling vehicle 10 within a safe range. As another example, first portion 12 may include a monitor that displays images outside vehicle 10. A user may deploy an unmanned module 18 and view the images captured by a camera and displayed on the monitor. This allows a user to inspect the surrounding area before getting in module 18 and deploying. As another example, roof 32 of module 18 may include a device to detect any object above module 18 that may obstruct its the deployment. This may be a sonar device. Detecting a possible obstruction may be configured as a safety condition to satisfy before module 18 is allowed to deploy. Any suitable logic may perform the functions of vehicle 10 and the components within vehicle 10.

FIG. 2 illustrates module 18 in more detail. Module 18 includes any suitable component that facilitates improved deployment capabilities and surveillance activities. In the illustrated embodiment, module 18 includes entrance 50, cameras 52 and 54, display 56, weather monitor 58, a user interface 60, one or more windows 62, and a climate control unit 64.

Entrance 50 represents an entry into module 18 from first portion 12. A user enters module 18 from first portion 12 through entrance 50 without exiting vehicle 10. Entrance 50 may be a hinged door, a sliding door, or a folding door. Entrance 50 may be made of a material that is resistant to the exterior elements when module 18 is deployed outside of vehicle 10. Entrance 50 may also include a manual safety restraint, a cable, or a chain to prevent entrance 50 from opening once it is closed. In an embodiment, entrance 50 includes a sensor to indicate when entrance 50 is closed. The closure of entrance 50 may be a safety condition checked before module 18 deploys.

Cameras 52 and 54 represent any devices that detect images and/or sounds outside module 18 for presentation to a user inside module 18. For example, cameras 52 and 54 may include an infrared detector, a motion detector, a charge coupled device image sensor, a thermal imaging device, a closed circuit device, any other suitable camera, or any suitable combination of the preceding. In the illustrated embodiment, camera 52 mounts inside roof 32 on an extendable and rotatable mast 53 and is covered by cover 34. Camera 52 may automatically or manually extend from roof 32 to provide the user with a view of the surrounding area. User interface 60 may include various controls, such as pan and zoom, that allow a user to control camera 52.

One or more cameras 54 mount on the bottom of module 18 and provide information, such as images and/or sounds, regarding the area under module 18 when module 18 is deployed. Because a user inside module 18 cannot observe directly under vehicle 10, the visibility provided by cameras 54 offers an additional safety feature for the user. Cameras 54 may mount on any suitable portion on the bottom of module 18. For example, cameras 54 may mount on opposite ends to provide a complete view of the surface below the deployed module 18. User interface 60 may include various controls, such as pan and zoom, that allow a user to control cameras 54.

Display 56 presents images received from cameras 52 and/or 54. Display 56 may include a computer monitor, a liquid crystal display, a black and white display, and/or a color display. Display 56 may present the images in any suitable way, such as through a split screen or a sequential image cycle, either automatically or as directed by the user. Display 56 may also present wind speed, temperature, barometric pressure, and/or any other indication from weather monitor 58. Display 56 may also present operational information, such as sensor readings, an operational log of module 18 including the timing of deployment and retraction sequences, and/or the positioning of vehicle 10.

Weather monitor 58 represents any device that monitors weather conditions outside module 18; such as measuring wind speed, detecting rain, detecting lightning, determining the temperature, and determining the barometric pressure; and communicates the information to the user in module 18. Weather monitor 58 may include an anemometer, a laser wind sensor, an ultrasonic wind sensor, any other device that monitors weather conditions, or any suitable combination of the preceding. Module 18 may deploy in most weather conditions. However, if the wind reaches a high speed, module 18 should not be deployed. A manufacturer and/or user may pre-configure vehicle 10 with the maximum wind speed in which module 18 may be deployed. If the wind speed reaches that predetermined maximum speed, weather monitor 58 may activate an alarm that informs the user to lower module 18, or module 18 may automatically lower if weather monitor 58 determines the wind speed reaches the predetermined maximum speed. In an embodiment, module 18 may not be deployed in wind speeds greater than forty miles per hour.

User interface 60 includes components that allow the user to operate module 18 and/or components within module 18. For example, user interface 60 includes a toggle or button to extend lifting mechanism 20 and deploy module 18, a toggle or button to deploy jacks 24, a joystick to control the positioning of cameras 52 and/or 54, and/or any suitable combination of the preceding. Vehicle 10 may include any suitable number of user interfaces 60. User interface 60 may mount to a particular portion of vehicle 10 or may mount to a remote device. In the illustrated embodiment, user interface 60a mounts inside module 18, user interface 60b mounts in first portion 12, and user interface 60c is tethered. User interface 60c may operate wirelessly to allow the user to control vehicle 10, module 18, and their components from any suitable location, including outside vehicle 10.

Window 62 represents a window that allows a user to view the surrounding area from module 18. Window 62 may be tinted, tempered, or bullet proof and may slide open and close. Climate control unit 64 provides air conditioning and/or heating inside module 18. User interface 60 may include a component to control climate control unit 64.

Modifications, additions, or omissions may be made to module 18 without departing from the scope of the invention. For example, a separate monitor may display weather conditions and include an alarm to activate when unsafe weather conditions occur. Module 18 may also include a bench seat, an observation chair, folding tables, tactical lighting inside and/or outside module 18, or other additional equipment to facilitate surveillance activities. For operation in an extreme environment, module 18 may be completely bulletproof, comprising radio communications and/or weapons. Any suitable logic may perform the functions of the components within module 18.

Figure 3:
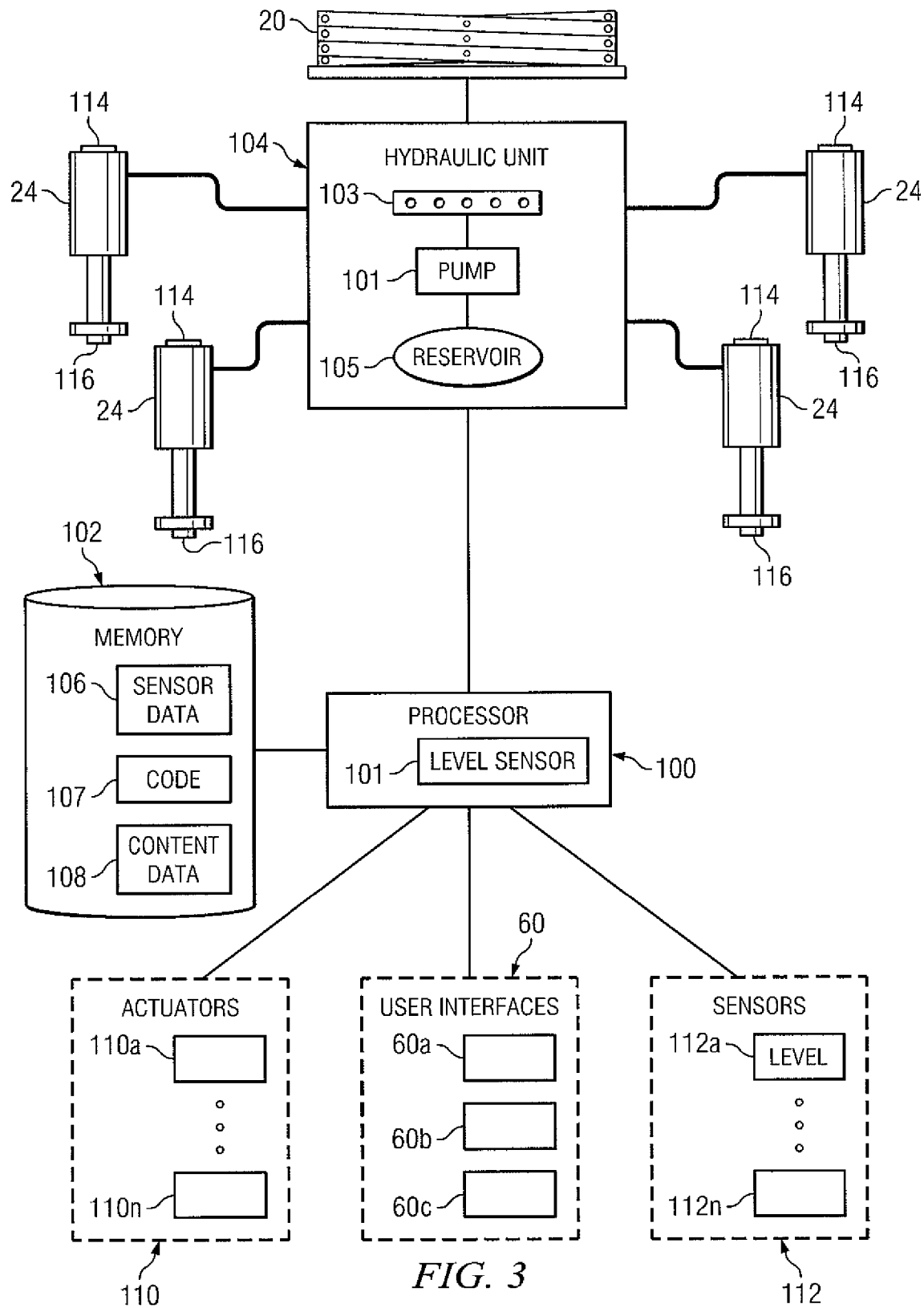
FIG. 3 illustrates an embodiment of components to operate the vehicle and the module.

FIG. 3 illustrates an embodiment of components to operate vehicle 10 and module 18. Processor 100 and/or hydraulic unit 104 facilitate the operation of lifting mechanism 20, jacks 24, actuators 110, user interfaces 60, sensors 112 and 114, and proximity switches 116.

Processor 100 represents a device that is operable to manage the operation of lifting mechanism 20, jacks 24, user interfaces 60, hydraulic unit 104, actuators 110, sensors 112 and 114, proximity switches 116, and/or any other component in vehicle 10. For example, processor 100 receives a deploy signal to initiate deployment of jacks 24. In response to the signal, processor 100 checks initial safety conditions determined by sensors 112 before activating hydraulic unit 104 to deploy jacks 24. Processor 100 also receives a surface signal from sensors 114 regarding the condition of surface 28. In response to this signal, processor 100 activates hydraulic unit 104 to adjust jacks 24 according to the condition of surface 28 and to meet another safety condition by leveling vehicle 10. In the illustrated embodiment, processor 100 includes an internal level sensor 101 that determines whether vehicle 10, module 18, and/or lifting mechanism 20 are level. Processor also may check additional safety conditions as determined by sensors 101 and proximity switch 116 before deploying module 18. Processor 100 activates hydraulic unit 104 to extend lifting mechanism 20. Processor 100 includes any hardware and/or software that operates to control the deployment and retraction sequences of module 18. Processor 100 may be a programmable logic device, a microcontroller, a microprocessor, any suitable processing device, or any suitable combination of the preceding.

Memory 102 stores, either permanently or temporarily, data, operational software, or other information for processor 100. Memory 102 includes any one or a combination of volatile or nonvolatile local or remote devices suitable for storing information. For example, memory 102 may include random access memory (RAM), read only memory (ROM), magnetic storage devices, optical storage devices, any other information storage device, or a combination of these devices. While illustrated as including particular information, memory 102 may include any information for use in operation of vehicle 10. In the illustrated embodiment, memory 102 includes sensor data 106, code 107, and content data 108.

Sensor data 106 represents information received from sensors 112 and 114 and information that processor 100 may use to process information from sensors 112 and 114. For example, sensor data 106 includes a predefined range of degrees for vehicle 10 to be level. If vehicle 10 is not level within this predefined range, module 18 may not deploy. In a particular embodiment, vehicle 10 must be level within two degrees from front-to-back and within two degrees from side-to-side before module 18 deploys. As another example, sensor data 106 may include the level of vehicle 10 as determined by sensor 112a for comparison with the level as determined by level sensor 101. In this embodiment, processor 100 compares the levels determined by sensor 101 and sensor 112a before deployment of module 18. The comparison should be within a suitable range of degrees before deployment, such as within 0.5 degrees of one another. The additional comparison provides a redundancy within the leveling system to further improve the safety of vehicle 10. As another example, sensor data 106 may include a predetermined time for vehicle 10 to be stationary before processor 100 automatically initiates a deployment sequence. In this example, sensor 112 determines that vehicle 10 is stationary for an amount of time and communicates this information to processor 100. Processor 100 compares the received information to the predetermined time stored in memory 102 and determines whether to begin the deployment sequence. The predetermined time may be any suitable amount of time as configured by a user or a manufacturer of vehicle 10. Sensor data 106 may also include a maximum wind speed in which module 18 may deploy. Processor 100 receives the actual wind speed from weather monitor 58, compares the actual speed to the maximum wind speed, and initiates an alarm that informs a user to lower module 18 and/or automatically initiates a retraction sequence if the actual speed is greater than or equal to the maximum speed. A manufacturer of vehicle 10 or the user may pre-configure the maximum wind speed. Sensor data 106 may also include information regarding the status of any of the following: entrance 50, the ignition of vehicle 10, the gears of vehicle 10, the voltage supply, the pressure in hydraulic unit 104, valves, hoses, and/or a reservoir in hydraulic unit 104.

Code 107 represents any suitable logic that controls the operation of processor 100. Code 107 includes software, executable files, and/or other appropriate logic modules. For example, code 107 includes executable files capable of facilitating the processing of sensor data 106.

Content data 108 represents any suitable information that processor 100 receives from the user and/or cameras 52 and 54. Content data 108 includes sounds, video, pictures, operational logs, times of deployment sequences and retraction sequences, notes and observations from the user, sensor readings, and/or weather conditions. Content data 108 may be stored in memory 102 for later retrieval or transmitted wirelessly to a remote location for observation and further analysis.

Hydraulic unit 104 represents any suitable component that regulates the operation of lifting mechanism 20, jacks 24, actuators 110, and/or any other suitable component in vehicle 10. Hydraulic unit 104 facilitates regulation of the flow of hydraulic fluid between valves and other components. In an embodiment, hydraulic unit 104 includes a pump 101, a hydraulic control manifold 103 with a series of control valves, a hydraulic reservoir 105, and one or more supply and return hoses. More specifically, pump 101 pressurizes the hydraulic fluid for delivery to lifting mechanism 20 and jacks 24, and manifold 103 controls the flow of pressurized hydraulic fluid from reservoir 105 through the control valves to selected components. This allows hydraulic unit 104 to separately control lifting mechanism 20 and jacks 24 using a single pump. As an example of operation, processor 100 receives a signal to initiate deployment of lifting mechanism 20. Processor 20 turns on pump 101 to control manifold 103. Manifold 103 distributes hydraulic fluid to deploy, adjust, and fixes jacks 24. Manifold 103 also deploys lifting mechanism 20 and extends module 18. Although FIG. 3 illustrates pump 101 that delivers the pressurized hydraulic fluid to lifting mechanism 20 and jacks 24, multiple pumps may be used to deliver the pressurized hydraulic fluid. For example, a separate pump may deliver fluid to lifting mechanism 20 and jacks 24. As another example, vehicle 10 may include multiple hydraulic units that may operate in a failover capacity if another hydraulic unit fails.

User interfaces 60 couple to processor 100 and communicate signals to processor 100 regarding deployment of module 18 and jacks 24, retraction of module 18 and jacks 24, and control of cameras 52 and 54. In the illustrated embodiment, user interface 60a is mounted inside module 18, user interface 60b is mounted in the interior of vehicle 10, and user interface 60c is mounted on a remote device that a user can use inside or outside of vehicle 10.

Actuators 110 represent a device operable to move or control a component in vehicle 10. Vehicle 10 includes any number of actuators 110 to operate the components. Actuators 110 may include hydraulic actuators, electrical actuators, electro-hydraulic actuators, electro-mechanical actuators, mechanical actuators, solenoid actuators, or any other suitable actuator. Actuators 110 may keep jacks 24 fixed, turn on tactical lighting, engage the parking brake, and/or control the deployment and operation of cameras 52 and 54 through inputs from user interface 60. Lifting mechanism 20 and jacks 24 are specific examples of actuators in vehicle 10. In the illustrated embodiment, lifting mechanism 20 is a hydraulic actuator and jacks 24 are hydraulic actuators. In the illustrated embodiment, hydraulic unit 104 powers lifting mechanism 20 and jacks 24. Voltage from a battery source may power other actuators 110.

Sensors 112 and 114 represent devices operable to determine a particular condition and communicate a signal regarding the condition to processor 100. Vehicle 10 may include any number of sensors 112 that provide information to processor 100 to determine whether safe conditions are satisfied. For example, sensors 112 may include a speed sensor, a parking sensor, a current sensor, a weather condition sensor, a wind speed sensor, a position sensor, a level sensor, an occupancy sensor, a camera, a sensor to determine whether lifting mechanism 20 fully retracts and/or fully extends, a battery charge sensor, a voltage sensor, a sensor to determine the hydraulic pressure in reservoir 105, a sensor to detect overheating, a sensor to detect pressure in hoses and/or valves, a sensor to detect the exertion of pump 101, and/or any other suitable type of sensor. A position sensor may include a global positioning system that provides location information of vehicle 10. The user of vehicle 10 may use this information to determine where to position vehicle 10. Also, vehicle 10 may communicate its position to a remote location for tracking. In the illustrated embodiment, sensor 112a is a level sensor that determines whether vehicle 10, module 18, and/or lifting mechanism 20 are level. Processor 100 uses the signal communicated from sensor 112a to determine whether a safety condition is met before deploying module 18. Cameras 52 and 54 and weather monitor 58 are specific examples of sensors. Additional sensors 112 may determine any other condition, such as whether jacks 24 fully retract before a user moves vehicle 10 or whether entrance 50 is closed.

In the illustrated embodiment, each jack 24 has a sensor 114 and a proximity switch 116. Sensor 114 facilitates determination of the condition of surface 28. For example, sensor 114 is a pressure sensor that determines the pressure caused by surface 28. The condition of surface 28 may cause jack 24 to exert varying amounts of pressure on sensor 114. Based on the information from sensor 114, processor 100 may determine to adjust jacks 24. In an embodiment, processor 100 retrieves sensor data 106 to determine the maximum adjustability of jacks 24. Based on sensor data 106 and the signal from sensor 114, processor 100 activates hydraulic unit 104 to adjust jacks 24 and level vehicle 10. If jacks 24 cannot adjust, processor 100 communicates a signal informing the user that vehicle 10 is not level and lifting mechanism 20 will not extend. A user may determine to move vehicle 10 to a new location to extend module 18.

Proximity switch 116 communicates information regarding the position of jack 24. For example, proximity switch 116 communicates a signal to processor 100 if jack 24 is retracted within vehicle 10 and communicates another signal to processor 100 if jack 24 is extended outside of vehicle 10. Processor 100 may use the information from proximity switch 116 to determine whether particular safety conditions are satisfied before proceeding with the operation of vehicle 10. For example, before module 18 deploys, processor 100 determines whether jacks 24 are extended and in place based on the signal from proximity switch 116. As another example, before a user moves vehicle 10, proximity switches 116 communicate signals to processor 100 regarding whether jacks 24 are retracted into vehicle 10. Proximity switch 116 may include a mechanical switch or a magnetic switch.

In an exemplary embodiment of operation, processor 100 receives a signal to begin a deployment sequence. Processor 100 may receive the signal from user interface 60, receive a signal from sensor 112 that vehicle 10 is in park for a predetermined amount of time, or any other suitable signal. Before proceeding with the deployment sequence, processor 100 checks initial safety conditions to confirm it is safe to deploy module 18. For example, sensors 112 communicate signals informing processor 100 that vehicle 10 is stationary for a predetermined period of time, that vehicle 10 is in park, that the vehicle ignition is off, that the emergency parking brake is engaged, and/or that entrance 50 to module 18 is closed.

Upon checking these initial safety conditions, processor 100 activates hydraulic unit 104. Manifold 103 in hydraulic unit 104 distributes hydraulic fluid through control valves to jacks 24, and jacks 24 begin to extend from base 22. Once jacks 24 have completely extended, sensor 114 determines the condition of surface 28 and sensor 112a determines whether vehicle 10 is level. Level sensor 112a communicates a signal informing processor 100 whether vehicle 10 is level within a predefined range. Processor 100 may also compare the signal provided by level sensor 112a to the level determined by the internal level sensor 101. If vehicle 10 is not level, processor 100 may communicate another signal to activate hydraulic unit 104 and cause manifold 103 to adjust jacks 24. Sensor 112a again determines whether vehicle 10 is level. If vehicle 10 is level, deployment of module 18 may begin. If vehicle 10 does not become level within the predefined range, module 18 will not extend.

Modifications, additions, or omissions may be made to the control components. Vehicle 10 may include a hydraulic system having a polyethylene tank, an electric motor, and integrated multi-battery power supply. Vehicle 10 may include a manual dump valve that overrides the control valve and allows lifting mechanism 20 to return to the stowed position in the case of an electrical or hydraulic failure. Vehicle 10 may also include an orifice to control the speed of descent of module 18. In a particular embodiment, lifting mechanism 20 includes the valve and the orifice. As another example, vehicle 10 includes an electrically-operated hydraulic solenoid valve that prevents lifting mechanism 20 from lowering in the event of a hose failure. The leveling system of vehicle 10 may also aide in the maintenance of vehicle 10, such as changing a flat tire or fixing components on the second side of base 22. In an embodiment, a user may control the operation of jacks 24 independent of processor 100. Using user interface 60, a user may level vehicle 10 independent of processor 100. Once the user levels vehicle 10, processor 100 may enable lifting mechanism 20 to extend. As yet another example, a user may operate cameras 52 and 54 independently of processor 100.

FIGS. 4A-4D illustrate vehicle 10 through the phases of operation. More specifically, FIGS. 4A-4D illustrate vehicle 10 before deployment of module 18, during deployment, and after deployment.

Figure 4A:
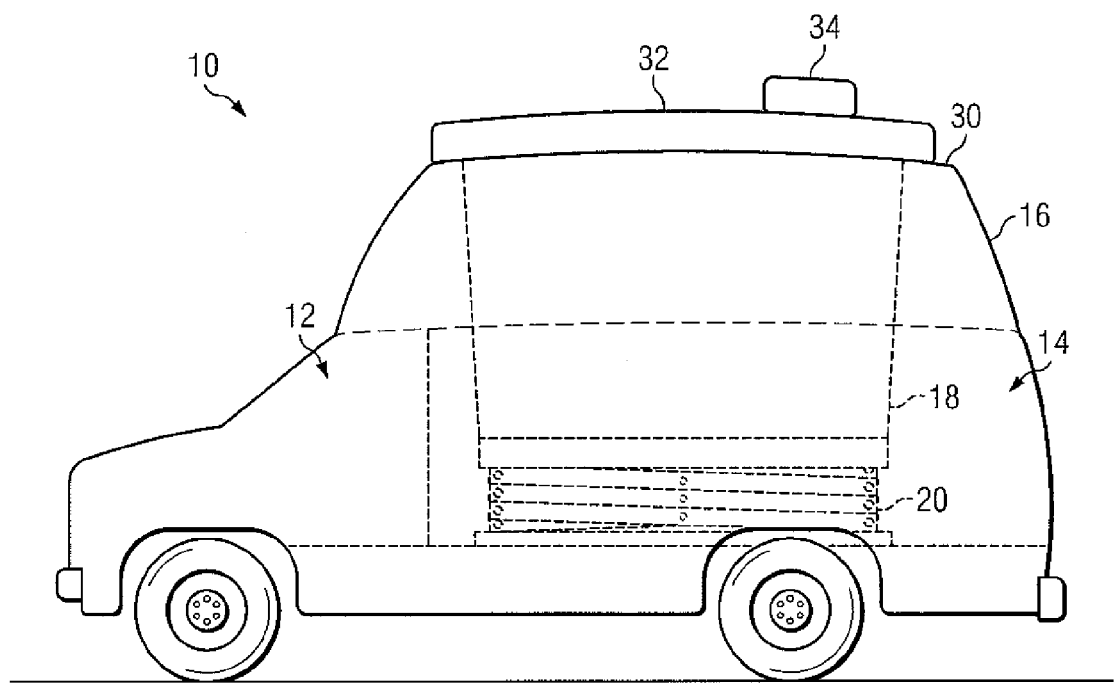
FIG. 4A illustrates an embodiment of the vehicle that deploys the module.

FIG. 4A illustrates an embodiment of vehicle 10 that deploys module 18. Vehicle 10 houses module 18 and lifting mechanism 20. Module 18 couples to lifting mechanism 20. When module 18 is within vehicle 10, roof 32 of module 18 couples to top 30 of third portion 16, which creates a tight seal. Cover 34 couples to roof 32 to enclose camera 52.

A user may position vehicle 10 in any suitable location. Module 18 and lifting mechanism 20 remain fixed in the retracted position while a user positions vehicle 10.

Figure 4B:
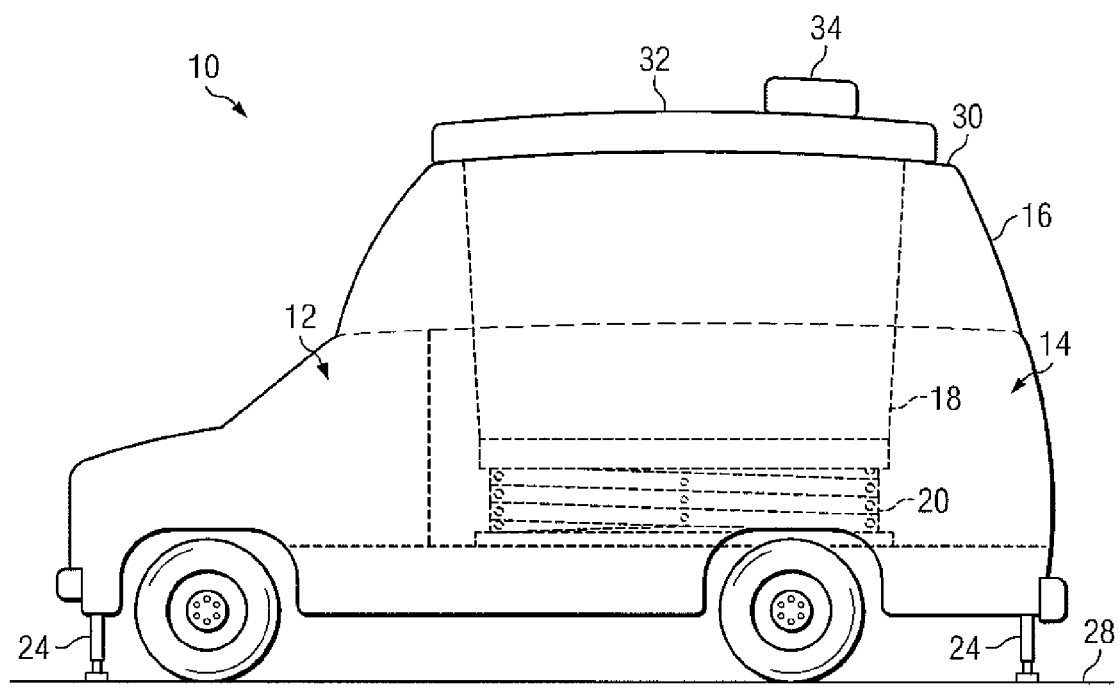
FIG. 4B illustrates an embodiment of the vehicle after deployment of the jacks.

FIG. 4B illustrates an embodiment of vehicle 10 after deployment of jacks 24. When a user positions vehicle 10 in the appropriate location and processor 100 checks the safety conditions, jacks 24 extend from vehicle 10 to keep vehicle 10 stationary, stable, and level when module 18 deploys. A manufacturer or user of vehicle 10 may configure any suitable safety conditions to be satisfied before jacks 24 extend from vehicle 10. These initial safety conditions may include vehicle 10 being in park, vehicle 10 being stationary for a predetermined period of time, the ignition of vehicle 10 being off, the emergency parking brake being engaged, an entrance to module 18 being closed and/or a user being in module 18.

Jacks 24 have three different modes of operation. In a first mode, jacks 24 extend from vehicle 10. In the second mode, jacks 24 adjust to level vehicle 10. In an embodiment, jacks 24 adjust in response to the conditions of surface 28. In the third mode, jacks 24 become fixed. Once jacks 24 are stable and fixed, module 18 may deploy.

Once jacks 24 deploy, additional safety conditions may be satisfied before the deployment sequence continues. These safety conditions may include confirming that vehicle 10 is level, confirming that jacks 24 are extended and stable, and/or confirming that an obstruction is not above vehicle 10 before module 18 extends.

Figure 4C:
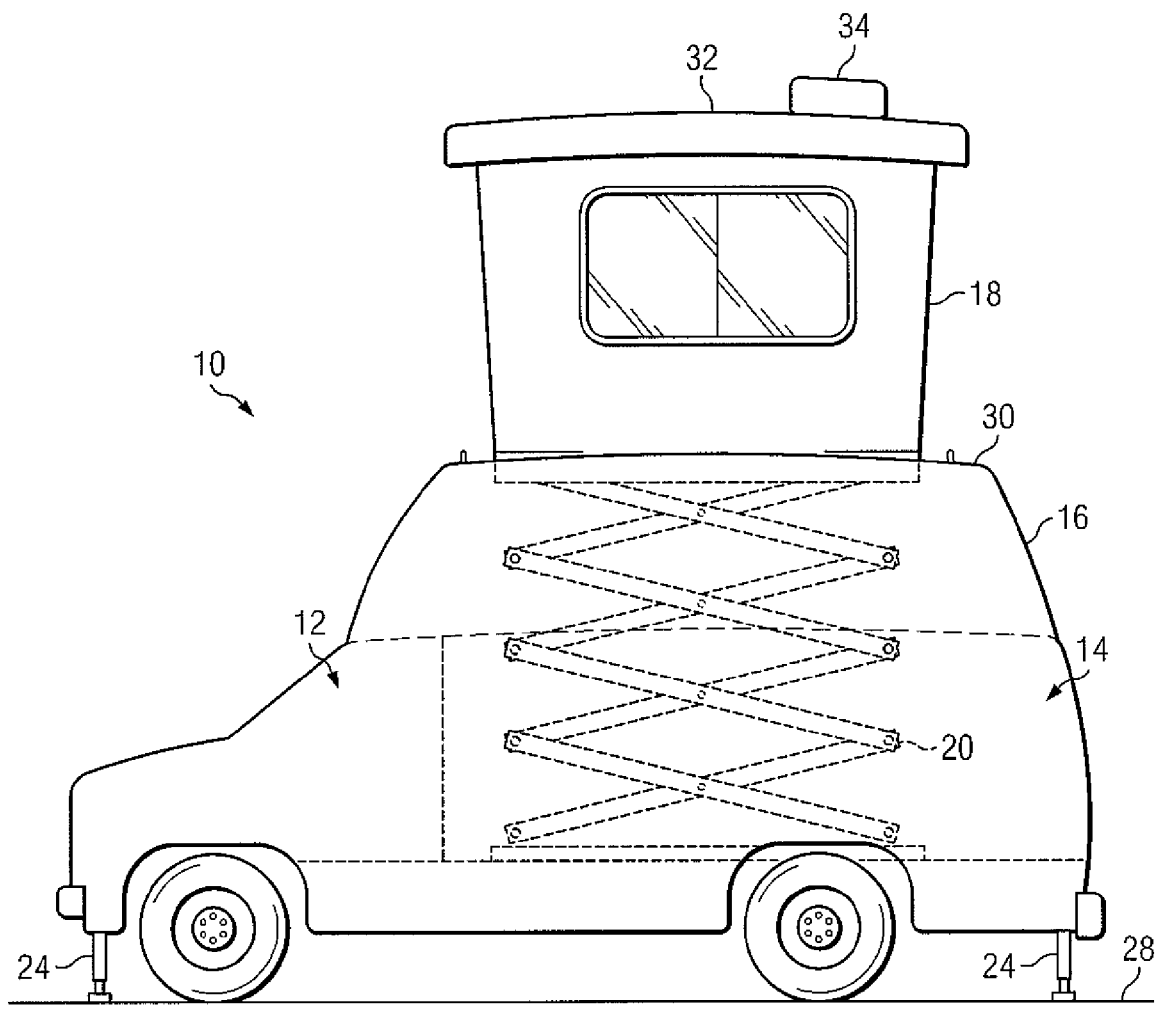
FIG. 4C illustrates an embodiment of the vehicle during deployment of the module.

FIG. 4C illustrates an embodiment of vehicle 10 during deployment of module 18. After vehicle 10 is level and jacks 24 are fixed in position, lifting mechanism 20 actuates and begins to extend. Module 18 extends out of opening 36 of third portion 16 as lifting mechanism 20 raises. As module 18 moves, the seal between top 30 and roof 32 decouples.

Figure 4D:
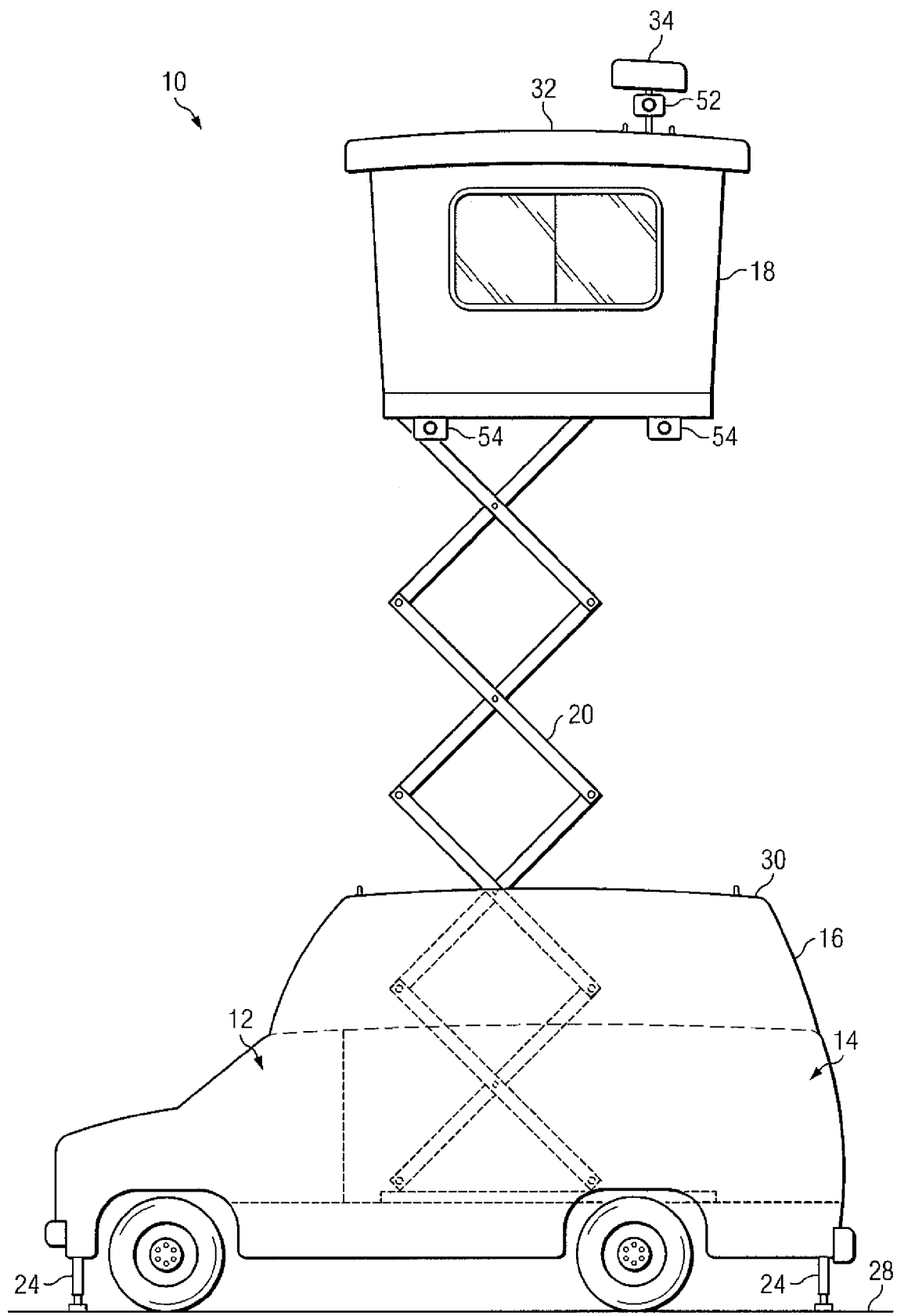
FIG. 4D illustrates an embodiment of the vehicle with the module completely extended.

FIG. 4D illustrates an embodiment of vehicle 10 with module 18 completely extended. When lifting mechanism 20 completely extends, module 18 is fully deployed outside of vehicle 10. In the fully deployed module 18, a user may have an observation height of over twenty-five feet from surface 28.

In the illustrated embodiment, cameras 52 and 54 are in use. Camera 52 extends out of roof 32, and cameras 54 under module 18 are used.

Figure 5A:
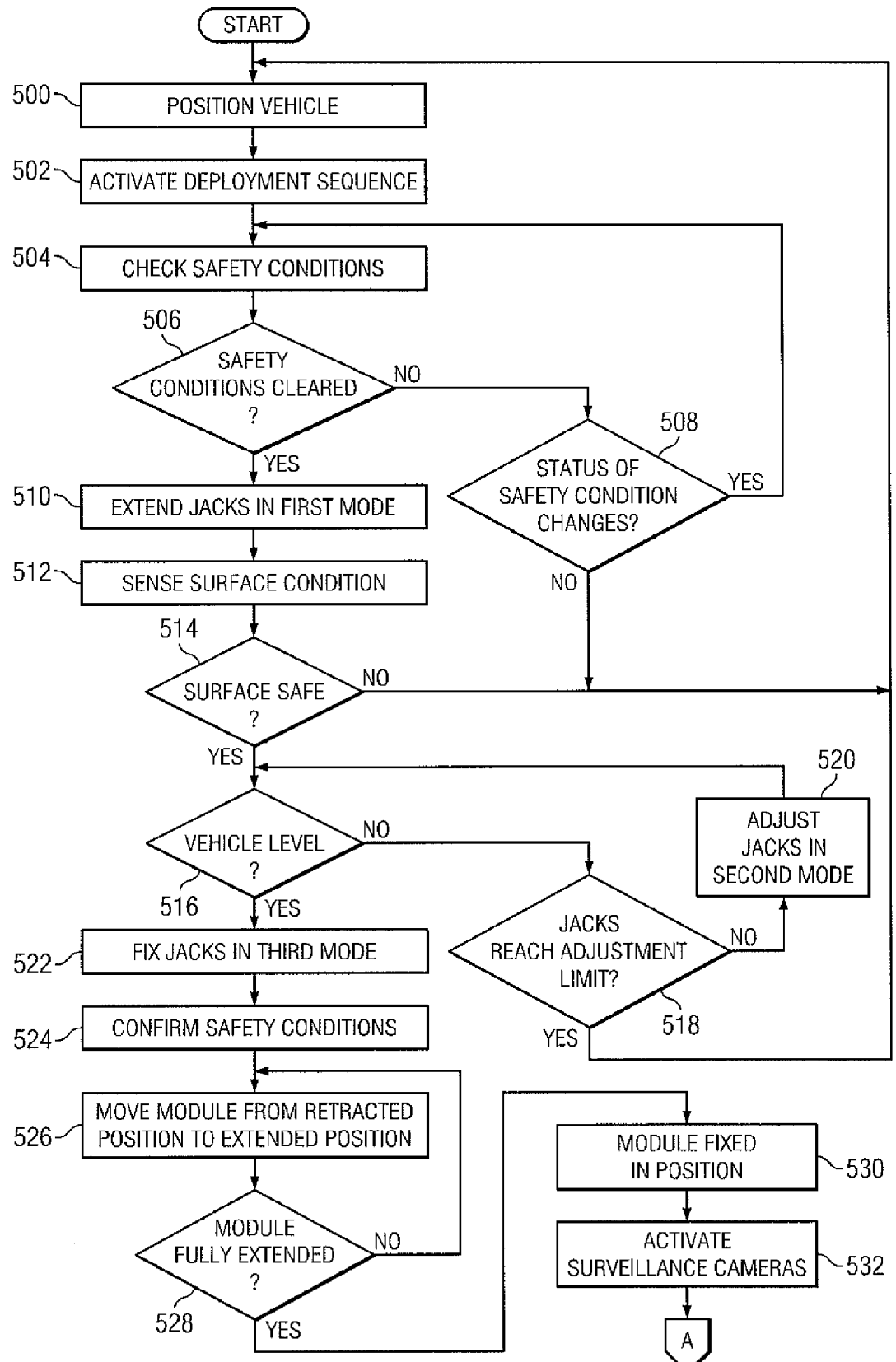
FIG. 5A is a flowchart that illustrates a deployment sequence of the module.

FIG. 5A is a flowchart that illustrates a deployment sequence of module 18. At step 500, a user positions vehicle 10. At step 502, the deployment sequence is activated. For example, a user may activate the deployment sequence by entering module 18 from first portion 12 and pressing a button. This sends a deploy signal to processor 100. As another example, sensor 112 may determine that vehicle 10 is in park for a predetermined amount of time, and sensor 112 communicates a deploy signal to processor 100. Processor 100 may then automatically activate the deployment sequence.

Processor 100 performs an initial check of the safety conditions at step 504. The safety conditions checked may include determining whether a gear shift of vehicle 10 is in park, determining whether the ignition of vehicle 10 is off, determining whether the emergency parking brake is engaged, determining whether entrance 50 to module 18 is closed, and/or determining whether a user occupies module 18. In an embodiment, a manufacturer of vehicle 10 or the user pre-configures the safety conditions for processor 100 to check. At step 506, processor 100 determines whether the safety conditions have cleared. If all of the safety conditions have not cleared, processor 100 determines at step 508 whether the status of a safety condition has changed. For example, turning off the ignition of vehicle 10 may be a safety condition. If the ignition is not off when processor 100 initially checks the safety conditions, processor 100 may determine that the status of a condition changes when the user turns off the ignition of vehicle 10. Processor then checks the safety conditions again from step 504. At step 506, processor 100 again determines whether all the safety conditions have cleared.

When the initial safety conditions clear, processor 100 activates hydraulic unit 104 to extend jacks 24 at step 510. To extend jacks 24, manifold 103 distributes hydraulic fluid through control valves to each jack 24. Jacks 24 operate in a first mode when extending from vehicle 10. At step 512, sensor 114 determines the condition of surface 28 and communicates a signal to processor 100. Processor 100 determines at step 514 if the condition of surface 28 is safe. For example, if surface 28 severely angles, vehicle 10 cannot become level and the surface condition is not safe. If the surface condition is not safe, jacks 24 retract into vehicle 10, and a user returns to first portion 12 and moves vehicle 10 to a new location.

At step 516, sensor 112a determines whether vehicle 10 is level. If vehicle 10 is not level, processor 100 determines whether jacks 24 have reached a maximum adjustment limit at step 518. If processor 100 cannot adjust jacks 24 further, jacks 24 retract into vehicle 10, a user returns to first portion 12 and moves vehicle 10 to a new location. If processor 100 can adjust jacks 24, jacks 24 operate in the second mode and adjust at step 520. Processor 100 again determines at step 516 whether adjusting jacks 24 has leveled vehicle 10. If vehicle 10 is not level, processor 100 may continue to adjust jacks 24 or jacks 24 may retract into vehicle 10 for a user to relocate vehicle 10.

If vehicle 10 is level, jacks 24 become fixed in a third mode at step 522. At step 524, processor 100 may reconfirm the initial safety conditions before deploying module 18. Processor 100 may also confirm additional safety conditions, such as confirming that jacks 24 are extended and stable and/or confirming that an obstruction is not above vehicle 10 before module 18 extends. At step 526, module 18 begins to move from a retracted position to an extended position. In an embodiment, a user activates the extension of module 18 by depressing and holding a button. Processor 100 activates hydraulic unit 104, which causes manifold 103 to distribute hydraulic fluid to lifting mechanism 20, and lifting mechanism 20 extends. If module 18 is not fully extended at step 528, module 18 continues to extend. Once module 18 fully extends, processor 100 module 18 fixes in place at step 530. Surveillance cameras 52 and 54 are activated and used at step 532. A user may then complete surveillance activities in the extended module 18. Once the user concludes the surveillance activities, the user may initiate a retraction sequence to return module 18 to vehicle 10.

Modifications, additions, or omissions may be made to the flowchart. For example, processor 100 may not reconfirm the initial safety conditions at step 524. As another example, lifting mechanism 20 may not extend fully and a user may stop lifting mechanism 20 at any position during the extension of module 18. Additionally, the steps may be performed in any suitable order, and any suitable component in vehicle 10 may perform the steps.

Figure 5B:
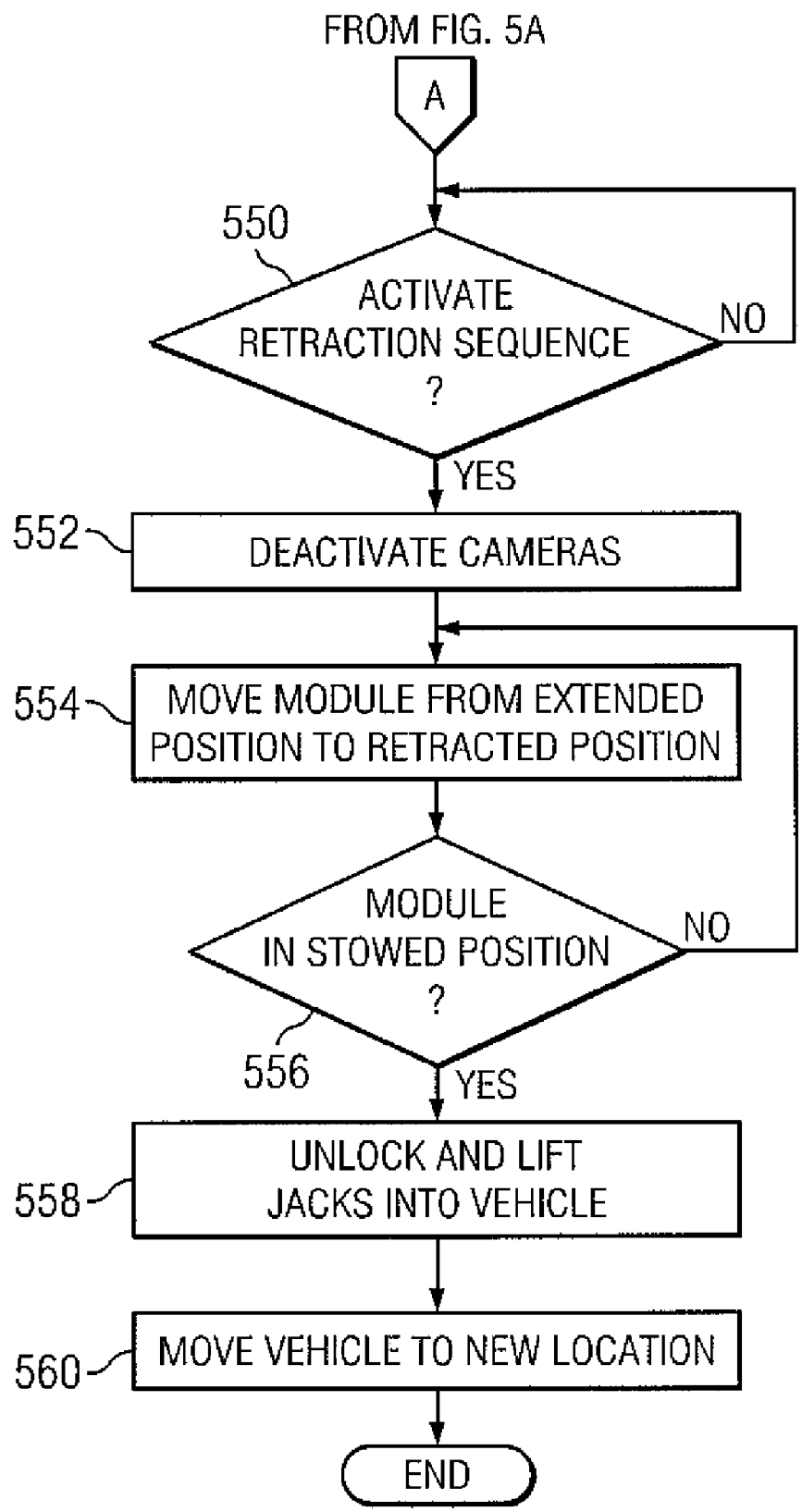
FIG. 5B is a flowchart that illustrates a retraction sequence of the module.

FIG. 5B is a flowchart that illustrates a retraction sequence of module 18. At step 550, processor 100 determines whether to activate the retraction sequence. In an embodiment, a user may press a button that communicates a signal to processor 100 to initiate the retraction sequence. In another embodiment, processor 100 may determine that the wind speed reaches a maximum wind speed and automatically initiates a retraction sequence.

At step 552, cameras 52 and 54 deactivate and are stored. At step 554, module 18 begins to lower into vehicle 10. In an embodiment, a user depresses and holds a button to lower module 18. Processor 100 determines at step 556 if module 18 is in the stowed position. If module 18 has not completely retracted, lifting mechanism 20 continues to retract and lower module 18.

When in the stowed position, roof 32 of module 18 couples to top 30 of third portion 16 to form the seal. Once module 18 and lifting mechanism 20 retract to the stowed position, jacks 24 retract from surface 28 into vehicle 10 at step 558. Jacks 24 operate in the first mode when retracting into vehicle 10. The user may now move vehicle 10 to a new location at step 560.

Modifications, additions, or omissions may be made to the flowchart. For example, a user may stop lifting mechanism 20 at any position during the retraction of module 18. As another example, a manufacturer or user of vehicle 10 may configure vehicle 10 to check certain safety conditions before a user can move vehicle 10 from the surveillance position. These safety conditions may include determining whether jacks 24 have retracted into vehicle 10 and/or determining that camera 52 has retracted into module 18. Additionally, the steps may be performed in any suitable order, and any suitable component in vehicle 10 may perform the steps.

Certain embodiments of the invention may provide one or more technical advantages. A technical advantage of one embodiment is improving the safety of a user manning a surveillance module. According to an embodiment of the present invention, the user may enter the surveillance module without leaving the vehicle, which prevents exposure to the outside elements or other potential hazards while moving into position to survey the area. Another technical advantage of an embodiment is providing a mobile module that a user can position in any suitable location. Improving the mobility of the surveillance module decreases costs associated with surveillance activities because modules can be moved between locations. Another technical advantage of an embodiment is decreasing the amount of time it takes for a user to begin surveillance activities. A user may quickly deploy the surveillance module. Yet another technical advantage of an embodiment is the increased elevation of the module, which enhances a user's field of view. Certain embodiments of the invention may include none, some, or all of the above technical advantages. One or more other technical advantages may be readily apparent to one skilled in the art from the figures, descriptions, and claims included herein.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for deploying a surveillance module from a vehicle, the method comprising:
   providing a module in a vehicle that comprises an enclosed housing that accommodates a user;
   positioning the vehicle at a location for surveillance;
   stabilizing the vehicle;
   if the vehicle is stabilized, moving the module vertically from a retracted position to an extended position through an opening in a top of the vehicle using a lifting mechanism, wherein the module is completely above the opening in the extended position.

2. The method of claim 1, further comprising receiving a deploy signal from a user interface before moving the module vertically from the retracted position.

3. The method of claim 1, wherein stabilizing the vehicle comprises extending at least two jacks from the vehicle to a surface, each jack comprises a sensor to generate a signal responsive to a condition of the surface contacted by the jacks.

4. The method of claim 3, further comprising:
   initiating adjustment of the jacks after contact with the surface in response to the signal from the sensor;
   determining whether the jacks have reached an adjustment limit;
   adjusting the jacks if the jacks have not reached the adjustment limit;
   positioning the vehicle at a different location if the jacks have reached the adjustment limit.

5. The method of claim 3, further comprising determining whether a selected one of the following safety conditions is met before moving the module vertically from the retracted position:
   the vehicle is stationary for a predetermined period of time;
   the jacks are stabilized;
   a gear shift of the vehicle is in park;
   an emergency parking brake is engaged;
   the entrance to the module is closed; and
   the vehicle is level within a range of degrees.

6. The method of claim 3, further comprising accessing sensor data to control a selected one of the jacks and the module, wherein the sensor data comprises at least one of the following:
   a maximum wind speed for the module to be in the extended position;
   a predetermined stationary time of the vehicle before the module is moved;
   a range of degrees for the vehicle to be considered level; and
   a maximum adjustment capability of each jack.

7. The method of claim 3, further comprising distributing hydraulic fluid to the lifting mechanism and the jacks to control a position of the lifting mechanism and the jacks, wherein distributing hydraulic fluid comprises distributing the hydraulic fluid through a control valve to a selected one of the lifting mechanism and the jacks.

8. The method of claim 1, further comprising:
   determining whether to lower the module, wherein determining whether to lower the module comprises receiving a signal from a user interface to initiate a retraction sequence;
   moving the module from the extended position to the retracted position if it is determined to lower the module.

9. A method for deploying a surveillance module from a vehicle, comprising:
   providing a module in a vehicle that comprises an enclosed housing that accommodates a user;
   positioning the vehicle at a first location for surveillance of a first geographical area;
   extending at least two jacks of a set of jacks from the vehicle, at the first location, to a surface to stabilize the vehicle, each extended jack comprises a sensor to generate a signal responsive to a condition of the surface contacted by the jacks if the vehicle is stabilized, moving the module, at the first location, vertically from a retracted position to an extended position through an opening in a top of the vehicle using a lifting mechanism, wherein the module is completely above the opening in the extended position;

moving the module, at the first location, from the extended position to the retracted position;
positioning the vehicle at a second location for surveillance of a second geographical area;
extending at least two jacks of the set of jacks from the vehicle, at the second location, to a surface to stabilize the vehicle, each extended jack comprises a sensor to generate a signal responsive to a condition of the surface contacted by the extended jacks;
if the vehicle is stabilized, moving the module, at the second location, vertically from a retracted position to an extended position using a lifting mechanism, wherein the module is completely above the opening in the extended position;
moving the module, at the second location, from the extended position to the retracted position.

10. The method of claim 9, wherein the vehicle is positioned at a selected one of a first location and a second location, further comprising:
initiating adjustment of the extended jacks after contact with the surface in response to the signal from the sensor;
determining whether the extended jacks have reached an adjustment limit;
adjusting the extended jacks if the extended jacks have not reached the adjustment limit;
positioning the vehicle at a different location if the extended jacks have reached the adjustment limit.

11. The method of claim 9, wherein the vehicle is positioned at a selected one of a first location and a second location, further comprising determining whether a selected one of the following safety conditions is met before moving the module vertically from the retracted position:
the vehicle is stationary for a predetermined period of time;
the extended jacks are stabilized;
a gear shift of the vehicle is in park;
an emergency parking brake is engaged;
the entrance to the module is closed; and
the vehicle is level within a range of degrees.

12. The method of claim 9, wherein the vehicle is positioned at a selected one of a first location and a second location, further comprising accessing sensor data to control a selected one of the extended jacks and the module, wherein the sensor data comprises at least one of the following:
a maximum wind speed for the module to be in the extended position;
a predetermined stationary time of the vehicle before the module is moved;
a range of degrees for the vehicle to be considered level; and
a maximum adjustment capability of each extended jack.

13. A vehicle for deploying a surveillance module, comprising:
a first portion configured to accommodate a user to operate the vehicle;
a second portion comprising:
a module as an enclosed housing configured to accommodate the user and comprising a roof and an entrance accessible by the user through an interior of the vehicle from the first portion; and
a lifting mechanism coupled to the module and operable to move the module vertically from a retracted position to an extended position; and
a third portion defining an opening to accommodate the module, wherein the module is completely above the opening in the extended position.

14. The vehicle of claim 13, further comprising:
at least two jacks, each jack operable to extend from the vehicle to a surface to stabilize the vehicle;
a plurality of sensors operable to generate a plurality of signals responsive to a condition of the surface contacted by the jacks; and
a processor coupled to the sensors and operable to receive the signals to control the jacks, wherein the processor is further operable to initiate adjustment of the jacks after contact with the surface in response to the signals.

15. The vehicle of claim 14, further comprising a user interface mounted inside the module, wherein the processor is further operable to receive a deploy signal from the user interface before moving the module vertically from the retracted position.

16. The vehicle of claim 14, further comprising a hydraulic unit coupled to the lifting mechanism and the jacks and operable to distribute hydraulic fluid to the lifting mechanism and the jacks, wherein:
the processor is coupled to the hydraulic unit and is further operable to control a flow of the hydraulic fluid to the lifting mechanism and the jacks; and
the hydraulic unit further comprises a manifold to distribute hydraulic fluid to the lifting mechanism and the jacks, wherein the manifold comprises a plurality of control valves and is operable to distribute the hydraulic fluid through a control valve to a selected one of the lifting mechanism and the jacks.

17. A vehicle for deploying a surveillance module, comprising:
a module as an enclosed housing configured to accommodate a user and comprising an entrance accessible by the user through an interior of the vehicle;
a lifting mechanism coupled to the module and operable to move the enclosed housing of the module vertically from a retracted position to an extended position through an opening in a top of the vehicle;
a plurality of jacks operable to extend from the vehicle to a surface to stabilize the vehicle prior to moving the enclosed housing of the module vertically from the retracted position; and
a hydraulic unit coupled to the lifting mechanism and the jacks and operable to distribute hydraulic fluid to the lifting mechanism and the jacks.

18. The vehicle of claim 17, wherein the hydraulic unit comprises a pump to pressurize the hydraulic fluid for delivery to both the lifting mechanism and the jacks.

19. The vehicle of claim 17, further comprising:
a plurality of sensors operable to generate a plurality of signals responsive to a condition of the surface contacted by the jacks; and
a processor coupled to the sensors and operable to receive the signals to control the jacks, wherein the processor is further operable to:
initiate adjustment of the jacks after contact with the surface in response to the signals; and
perform at least one of the following steps before moving the enclosed housing of the module vertically from the retracted position:
determine the vehicle is stationary for a predetermined period of time;
determine the jacks are stabilized;
determine a gear shift of the vehicle is in park;
determine an emergency parking brake is engaged;
determine the entrance to the enclosed housing of the module is closed; and determine the vehicle is level within a range of degrees.

20. The vehicle of claim 17, further comprising a memory having sensor data accessible by the processor to control a selected one of the jacks and the module, the sensor data comprises at least one of the following:

a maximum wind speed for the enclosed housing of the module to be in the extended position;

a predetermined stationary time of the vehicle before the enclosed housing of the module is moved;

a range of degrees for the vehicle to be considered level; and a maximum adjustment capability of each jack.

* * * * *